H. HENLEY.
Fruit Drier.
No. 78,285.   Patented May 26, 1868.
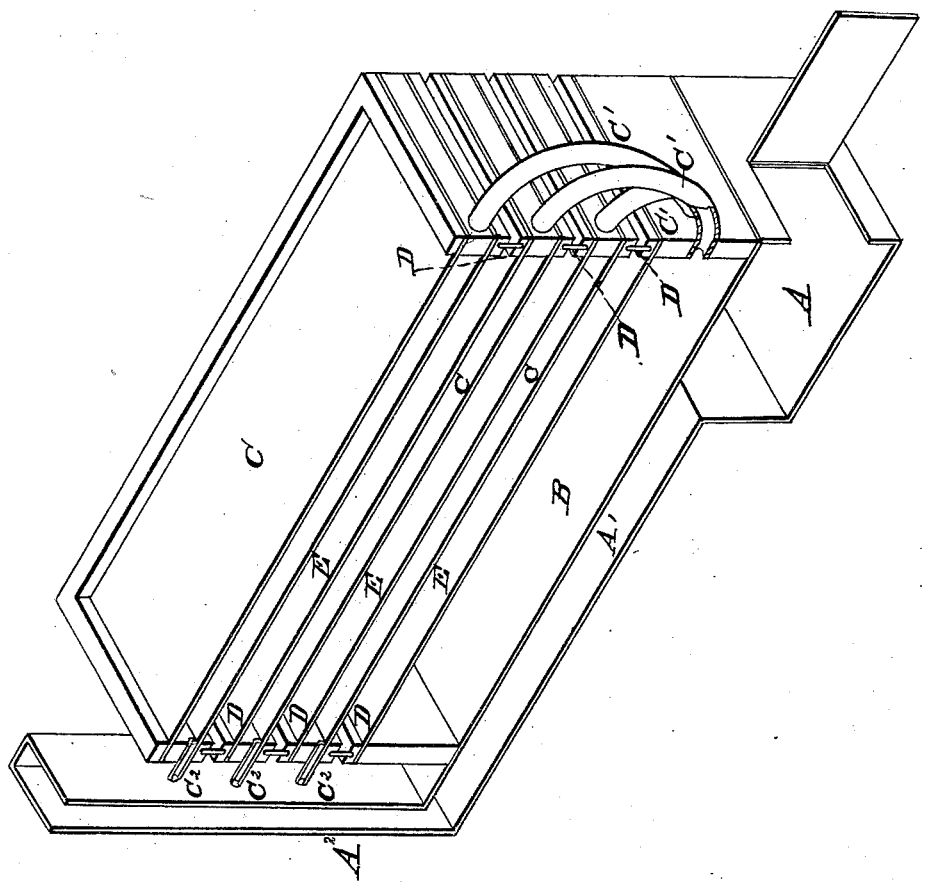
Witnesses:
J. Snowden Bell
J. W. White
Inventor:
H. Henley
per T. H. Alexander
Atty

United States Patent Office.

HENRY HENLEY, OF HALBERT'S BLUFF, INDIANA.

*Letters Patent No. 78,285, dated May 26, 1868.*

IMPROVEMENT IN DRIERS.

*The Schedule referred to in these Letters Patent and making part of the same.*

TO ALL WHOM IT MAY CONCERN:

Be it known that I, HENRY HENLEY, of Halbert's Bluff, in the county of Martin, and State of Indiana, have invented certain new and useful Improvements in Apparatus for Drying Fruits, Vegetables, Lumber, &c.; and I do hereby declare that the following is a full, clear, and exact description thereof, reference being had to the accompanying drawings, and to the letters of reference marked thereon, which form a part of this specification, and which represent a section, in perspective, of a drier for fruit, vegetables, or other articles, embracing my improvements.

The object of my invention is to provide an apparatus for drying fruit or other substances expeditiously, and without risk of damaging them by the application of excessive heat, and to this end my improvements consist in so arranging a number of movable steam-heated pans, in connection with a steam-boiler, and communicating with the same by suitable pipes, as to form receptacles, where articles can be quickly and safely dried.

In the accompanying drawing, A represents a furnace, which may be of any desired construction, provided with a flue, $A^1$, and stack $A^2$. A steam-boiler, B, is set upon the top of the furnace and flue. It is rectangular in form, with wooden ends and sides, and sheet-iron or tin top and bottom. Pans, C C, are arranged, one above the other, on top of the boiler, and communicating with it by flexible pipes, of rubber or other suitable material, so as to be capable of being moved from their positions, without interrupting their communication with the boiler. These pans are rectangular in form, and have wooden sides and ends, and tin or sheet iron-tops and bottoms, like the boiler. $C^1 C^1$ represent the pipes which connect the pans with the boiler, and $C^2 C^2$ pipes which allow egress to the steam after it has filled the pans, and also to the water condensed in the pans. Said pipes may empty into a tube leading to the bottom of the boiler, for conveying the condensed steam back thereto. I would observe that if this tube is employed, it should have an open mouth, to allow of the escape of the surplus steam, or for supplying the boiler with water.

D D are pins, upon which the pans rest. The sides and ends of the pans project above and below the tops and bottoms of the pans, and the top of the boiler is similarly constructed, thus forming ledges, to prevent the material to be dried from falling off.

The fruit, vegetables, or other substances to be dried, are laid upon the top of the boiler and in the spaces between the pans, and the steam from the boiler, passing through the pipes $C^1 C^1$, fills the pans, and afterwards, having free egress through the pipes $C^2$, does not rise above the atmospheric pressure, and maintains the temperature due thereto, $212°$ in the pans. The chambers E are thus exposed to the heat on their tops and bottoms, which rapidly dries the materials therein, the vapor passing out at their sides and ends, and, as the temperature does not rise above $212°$, there is no danger of scorching.

A lumber-drier on my plan may be constructed by building a small house with double walls, and having a thin sheet-iron floor, which forms the top of a boiler. The lumber is supported upon the floor, and steamed by admitting the steam to the interior of the house. The steam is then allowed to escape, and fresh steam from the boiler is passed through the spaces between the walls, drying the lumber in the manner first stated. Various forms of furnaces or heating-apparatus may be used, according to convenience.

I am aware that there is no novelty in the introduction of steam into stationary or fixed pans or boxes for drying purposes, I therefore lay no claim to this feature.

Having thus fully described my improved fruit-drier, what I claim therein as new, and desire to secure by Letters Patent, is—

1. The construction and arrangement of the movable steam-heated pans C, so as to apply a regular heat above and below the chambers E.

2. The combination of the boiler B, removable pans C, and flexible pipes C', when arranged and operating as and for the purpose set forth.

In testimony that I claim the foregoing as my own, I affix my signature in presence of two witnesses.

HENRY HENLEY.

Witnesses:
   A. R. BROWN,
   JOSIAH MARLY.